(12) United States Patent
Line et al.

(10) Patent No.: US 11,919,361 B2
(45) Date of Patent: Mar. 5, 2024

(54) VEHICLE FLOOR PANEL

(71) Applicant: Ford Global Technologies, LLC, Dearborn, MI (US)

(72) Inventors: Johnathan Andrew Line, Northville, MI (US); Scott Culver Anderson, Commerce Township, MI (US); Clay Mastin, Ferndale, MI (US); Justin D. Sorum, Royal Oak, MI (US); Albert Kim, Irvine, CA (US); Abbas Ghamlouche, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 17/700,007

(22) Filed: Mar. 21, 2022

(65) Prior Publication Data

US 2023/0294477 A1 Sep. 21, 2023

(51) Int. Cl.
*B60H 1/02* (2006.01)
*B60H 1/00* (2006.01)
(Continued)

(52) U.S. Cl.
CPC ........... *B60H 1/00028* (2013.01); *B60N 2/06* (2013.01); *B60N 2/14* (2013.01); *B60P 7/0807* (2013.01);
(Continued)

(58) Field of Classification Search
CPC ...... B60H 1/00028; B60H 2001/00221; B60N 2/06; B60N 2/14; B60P 7/0807; B62D 25/20
(Continued)

(56) References Cited

U.S. PATENT DOCUMENTS 2,696,774 A  12/1954 Bayley
3,919,926 A  * 11/1975 Yamada ................. B60H 1/246
454/144

(Continued)

FOREIGN PATENT DOCUMENTS

CN  104859648 A  *  8/2015  ............. B60N 2/005
EP  3251894 A1  6/2017
(Continued)

OTHER PUBLICATIONS

U.S. Appl. No. 17/700,018, filed Mar. 21, 2022, Docketed New Case—Ready for Examination, Seating Solutions for a Stationary Vehicle.
(Continued)

*Primary Examiner* — Joseph D. Pape
(74) *Attorney, Agent, or Firm* — Vichit Chea; Price Heneveld LLP

(57) ABSTRACT

A vehicle includes a passenger compartment. The passenger compartment includes an upper region and a lower region. The passenger compartment also includes a floor. A plurality of track assemblies are positioned on the floor and extend along a longitudinal direction of the vehicle. Each of the plurality of track assemblies includes a first rail assembly and a second rail assembly. Ductwork is positioned between adjacent track assemblies of the plurality of track assemblies. The plurality of track assemblies and the ductwork are coupled together as a floor panel such that installation of the floor panel within the passenger compartment results in a simultaneous installation of the plurality of track assemblies and the ductwork.

20 Claims, 9 Drawing Sheets

(51) Int. Cl.
  *B60N 2/06* (2006.01)
  *B60N 2/14* (2006.01)
  *B60P 7/08* (2006.01)
  *B62D 25/20* (2006.01)

(52) U.S. Cl.
  CPC .... *B62D 25/20* (2013.01); *B60H 2001/00221* (2013.01)

(58) Field of Classification Search
  USPC .............................................. 296/208, 65.13
  See application file for complete search history.

(56) References Cited

U.S. PATENT DOCUMENTS

| | | | |
|---|---|---|---|
| 4,184,656 A * | 1/1980 | Wakeley | B64D 11/0689 244/118.6 |
| 5,028,016 A * | 7/1991 | Kelvin | B64D 11/0015 297/257 |
| 5,832,555 A | 11/1998 | Saucier et al. | |
| 5,911,465 A * | 6/1999 | Yamamoto | B60R 22/26 414/537 |
| 6,179,545 B1 | 1/2001 | Petersen, Jr. et al. | |
| 6,530,831 B1 * | 3/2003 | Colinet | B60H 1/247 454/144 |
| 6,536,842 B2 | 3/2003 | Bowers et al. | |
| 6,572,054 B1 * | 6/2003 | Smallhorn | H05K 7/20145 244/119 |
| 7,111,900 B2 * | 9/2006 | Chernoff | B62D 23/00 296/193.07 |
| 7,434,871 B2 * | 10/2008 | Mizuma | B60N 2/015 296/65.13 |
| 8,061,675 B2 | 11/2011 | Downey | |
| 8,633,424 B2 * | 1/2014 | Chernyavsky | B60H 1/12 219/202 |
| 9,004,993 B2 | 4/2015 | Fujii et al. | |
| 9,233,791 B2 | 1/2016 | Bushnell et al. | |
| 9,271,883 B2 | 3/2016 | Johnson et al. | |
| 9,670,013 B2 | 6/2017 | Parrish | |
| 10,369,865 B2 | 8/2019 | Perkins | |
| 10,688,889 B2 | 6/2020 | Feng et al. | |
| 10,857,913 B2 | 12/2020 | Dry et al. | |
| 10,919,428 B2 | 2/2021 | Wallace et al. | |
| 10,981,430 B2 | 4/2021 | Jeong | |
| 2013/0252529 A1 | 9/2013 | Baldsiefen et al. | |
| 2019/0381858 A1 | 12/2019 | Sadowski et al. | |
| 2019/0382224 A1 | 12/2019 | Vollmar et al. | |
| 2020/0406787 A1 | 12/2020 | Line et al. | |
| 2020/0406789 A1 | 12/2020 | Line et al. | |
| 2021/0053416 A1 | 2/2021 | Suzuki et al. | |

FOREIGN PATENT DOCUMENTS

| | | |
|---|---|---|
| JP | 5081661 B2 | 11/2012 |
| JP | 2020047174 A | 3/2020 |

OTHER PUBLICATIONS

U.S. Appl. No. 17/699,952, filed Mar. 21, 2022, Docketed New Case—Ready for Examination, Seat-Mounted Work Surface.
U.S. Appl. No. 17/700,057, filed Mar. 21, 2022, Docketed New Case—Ready for Examination, Seating Solutions for a Stationary Vehicle.
U.S. Appl. No. 17/700,081, filed Mar. 21, 2022, Docketed New Case—Ready for Examination, Seating Solutions for a Stationary Vehicle.
U.S. Appl. No. 17/699,981, filed Mar. 21, 2022, Docketed New Case—Ready for Examination, Seating Solutions for a Vehicle.
U.S. Appl. No. 17/699,755, filed Mar. 21, 2022, Docketed New Case—Ready for Examination, Vehicle Seating System for a Stationary Vehicle.
U.S. Appl. No. 17/699,781, filed Mar. 21, 2022, Docketed New Case—Ready for Examination, Vehicle Seating System for a Stationary Vehicle.
U.S. Appl. No. 17/699,996, filed Mar. 21, 2022, Docketed New Case—Ready for Examination, Seating Assembly with Swivel Capability.

* cited by examiner

VEHICLE FLOOR PANEL

FIELD OF THE DISCLOSURE

The present disclosure generally relates to a vehicle. More specifically, the present disclosure relates to a vehicle floor panel.

BACKGROUND OF THE DISCLOSURE

Vehicles are often provided with climate control features. As consumers drive changes in the automotive industry, alternative approaches for vehicle development, manufacture, and marketing can be beneficial. While in current vehicle designs there would be safety concerns about using some alternative functionality within a passenger compartment of a moving vehicle, it is anticipated that technology and the regulatory framework may evolve in the future to where such an activity is safe and permissible.

SUMMARY OF THE DISCLOSURE

According to a first aspect of the present disclosure, a vehicle includes a passenger compartment. The passenger compartment includes an upper region and a lower region. The passenger compartment also includes a floor. A plurality of track assemblies are positioned on the floor and extend along a longitudinal direction of the vehicle. Each of the plurality of track assemblies includes a first rail assembly and a second rail assembly. Ductwork is positioned between adjacent track assemblies of the plurality of track assemblies. The plurality of track assemblies and the ductwork are coupled together as a floor panel such that installation of the floor panel within the passenger compartment results in a simultaneous installation of the plurality of track assemblies and the ductwork.

Embodiments of the first aspect of the disclosure can include any one or a combination of the following features:
- the first and second rail assemblies of each of the plurality of track assemblies includes a slot defined by the given rail assembly, wherein the slot permits access to a channel defined by the given rail assembly;
- the floor panel further includes a floor covering positioned over top of the ductwork and the plurality of track assemblies, wherein the floor covering is configured to maintain access to the slots of the first and second rail assemblies of each of the plurality of track assemblies;
- a carriage assembly that is configured to be received within the channel, wherein the carriage assembly extends upwardly into the slot;
- the carriage assembly includes an anchor;
- the anchor is configured to engage with, and retain, a leg of a seating assembly;
- the anchor defines an anchor aperture, wherein the anchor aperture provides a cargo tie-down within the passenger compartment;
- each of the plurality of track assemblies has a length that is greater than 25% of a length of the passenger compartment;
- the ductwork includes upper ductwork and lower ductwork;
- the upper ductwork is positioned between the first and second rail assemblies of at least two of the plurality of track assemblies, wherein the upper ductwork is configured to deliver air to the upper region of the passenger compartment, and wherein the lower ductwork is configured to deliver air to the lower region of the passenger compartment;
- a support member positioned in at least one location chosen from between adjacent rail assemblies and between adjacent track assemblies;
- the support member at least partially defines a chamber, wherein a lower wall of the chamber is the floor of the passenger compartment;
- the ductwork is received in the chamber;
- a support bracket coupled to each of a first side and a second side of each of the first and second rail assemblies;
- the support bracket supports an underside of the support member; and
- the support brackets suspend the support member above the floor of the passenger compartment.

According to a second aspect of the present disclosure, a vehicle includes a passenger compartment, a floor of the passenger compartment, a plurality of track assemblies, a support member, lower ductwork, upper ductwork, and a floor covering. The passenger compartment includes an upper region and a lower region. The plurality of track assemblies are positioned on the floor and extend along a longitudinal direction of the vehicle. The plurality of track assemblies each have a length that is greater than twenty-five percent of a length of the passenger compartment. Each of the plurality of track assemblies includes a first rail assembly and a second rail assembly. The first and second rail assemblies of each of the plurality of track assemblies includes a slot defined by the given rail assembly. The slot permits access to a channel defined by the given rail assembly. The support member is positioned in at least one location chosen from between adjacent rail assemblies and between adjacent track assemblies. The lower ductwork is positioned between adjacent track assemblies of the plurality of track assemblies. The lower ductwork is configured to deliver air to the lower region of the passenger compartment. The upper ductwork is positioned between the first and second rail assemblies of at least two of the plurality of track assemblies. The upper ductwork is configured to deliver air to the upper region of the passenger compartment. The floor covering is positioned over top of the upper ductwork, the lower ductwork, and the plurality of track assemblies. The floor covering is configured to maintain access to the slots of the first and second rail assemblies of each of the plurality of track assemblies. The plurality of track assemblies, the support member, the lower ductwork, the upper ductwork, and the floor covering are coupled together as a floor panel such that installation of the floor panel within the passenger compartment results in a simultaneous installation of the plurality of track assemblies, the support member, the lower ductwork, the upper ductwork, and the floor covering.

Embodiments of the second aspect of the present disclosure can include any one or a combination of the following features:
- a carriage assembly that is configured to be received within the channel, wherein the carriage assembly extends upwardly into the slot, and wherein the carriage assembly comprises an anchor;
- the anchor is configured to engage with, and retain, a leg of a seating assembly; and
- the anchor defines an aperture, wherein the aperture provides a cargo tie-down within the passenger compartment.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
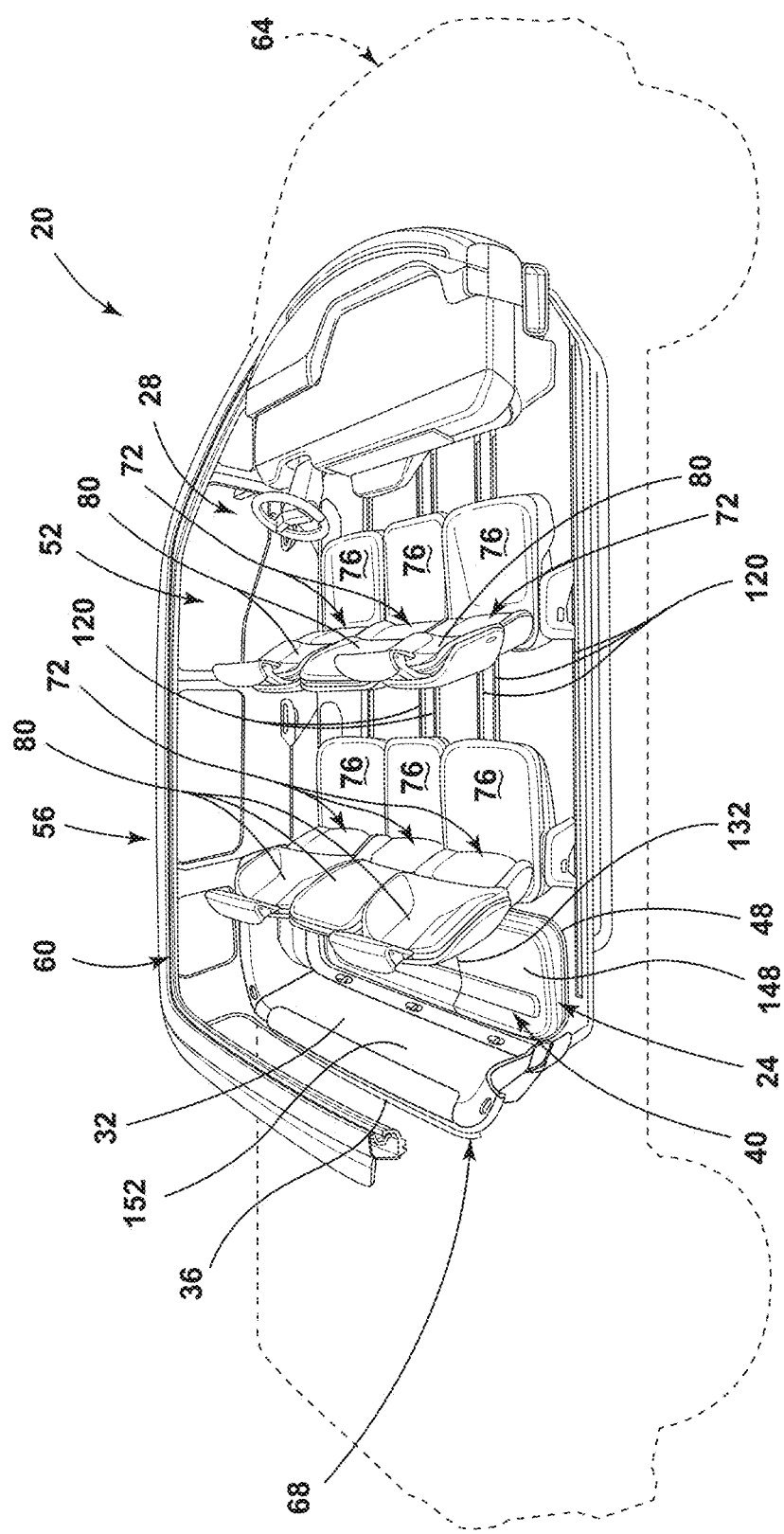
FIG. 1 is a side perspective view of a passenger compartment of a vehicle, illustrating various rows of seating assemblies, according to one arrangement.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle floor panel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-9, reference numeral 20 generally designates a vehicle. The vehicle 20 may be a motor vehicle. While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many, or all, commuting functions (e.g., accelerating, breaking, turning, signaling, etc.) independent of user interaction while the user maintains override control of the vehicle 20. A seating assembly 24 is provided within a passenger compartment 28 of the vehicle 20.

Referring again to FIGS. 1-9, the seating assembly 24 includes a seatback 32 that is coupled to a support surface 36. In various examples, the seatback 32 may be fixedly coupled to the support surface 36. A seat 40 is movably coupled to the seatback 32 such that the seat 40 is pivotable relative to the seatback 32. The movable coupling of the seat 40 to the seatback 32 may be an indirect coupling. For example, the seat 40 may be movably coupled to the support surface 36. The seat 40 is movable between a stowed position (FIGS. 2 and 3) and a deployed position (FIG. 1). A work surface 44 is movably coupled to an underside 48 of the seat 40. The work surface 44 is movable between a stowed position (FIGS. 1 and 2) and a deployed position (FIGS. 2 and 3), as will be discussed in further detail herein. The work surface 44 can provide a working area when the vehicle 20 is in a stationary non-moving state (e.g., while a transmission of the vehicle 20 is in park).

Referring further to FIGS. 1-9, the vehicle 20 can include a first row of seating assemblies 52, a second row of seating assemblies 56, and/or a third row of seating assemblies 60. The first row of seating assemblies 52 may be positioned nearest a front 64 of the vehicle 20 and/or the passenger compartment 28. The third row of seating assemblies 60 may be positioned nearest to a rear 68 of the vehicle 20 and/or the passenger compartment 28. The second row of seating assemblies 56 may be positioned at an intermediate location between the first and second rows of seating assemblies 52, 60. The first row of seating assemblies 52 and the second row of seating assemblies 56 can be provided with seating assemblies 72 that differ from the seating assemblies 24, as will be discussed in further detail herein. The seating assemblies 72 can each include a seat 76 and a seatback 80. The seat 76 and the seatback 80 of the seating assemblies 72 may be coupled to one another (e.g., by an intermediate structure) such that the seatback 80 is pivotable relative to the seat 76 and the seat 76 is pivotable relative to the seatback 80 (see FIG. 3). In some examples, the seating assemblies 72 may include a lower leg support. In such an example, the lower leg support may be rotatably coupled to a front end of the seat 76 such that the lower leg support is rotatable relative to the seat 76.

Referring still further to FIGS. 1-9, in various examples, one or more of the seating assemblies 72 may be provided with the ability to swivel or rotate about a vertical axis, where the vertical axis extends through the seat 76. Accordingly, such an example of the seating assembly 72 may be capable of being oriented in a forward-facing position and/or a rearward-facing position (see FIG. 2). The seating assemblies 72 can each be coupled to a pair of rail assemblies 120. The rail assemblies 120 can each extend along a longitudinal direction of the passenger compartment 28. The rail assemblies 120 may each have a length that is at least about 25% of a length of the passenger compartment 28. For example, the length of the rail assemblies 120 may be at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, and/or combinations or ranges thereof of a longitudinal length of the passenger compartment 28. The seating assemblies 72 may be transitionable between the first row of seating assemblies 52 and/or the second row of seating assemblies 56 to accomplish the various arrangements of the passenger compartment 28 depicted herein.

Figure 2:
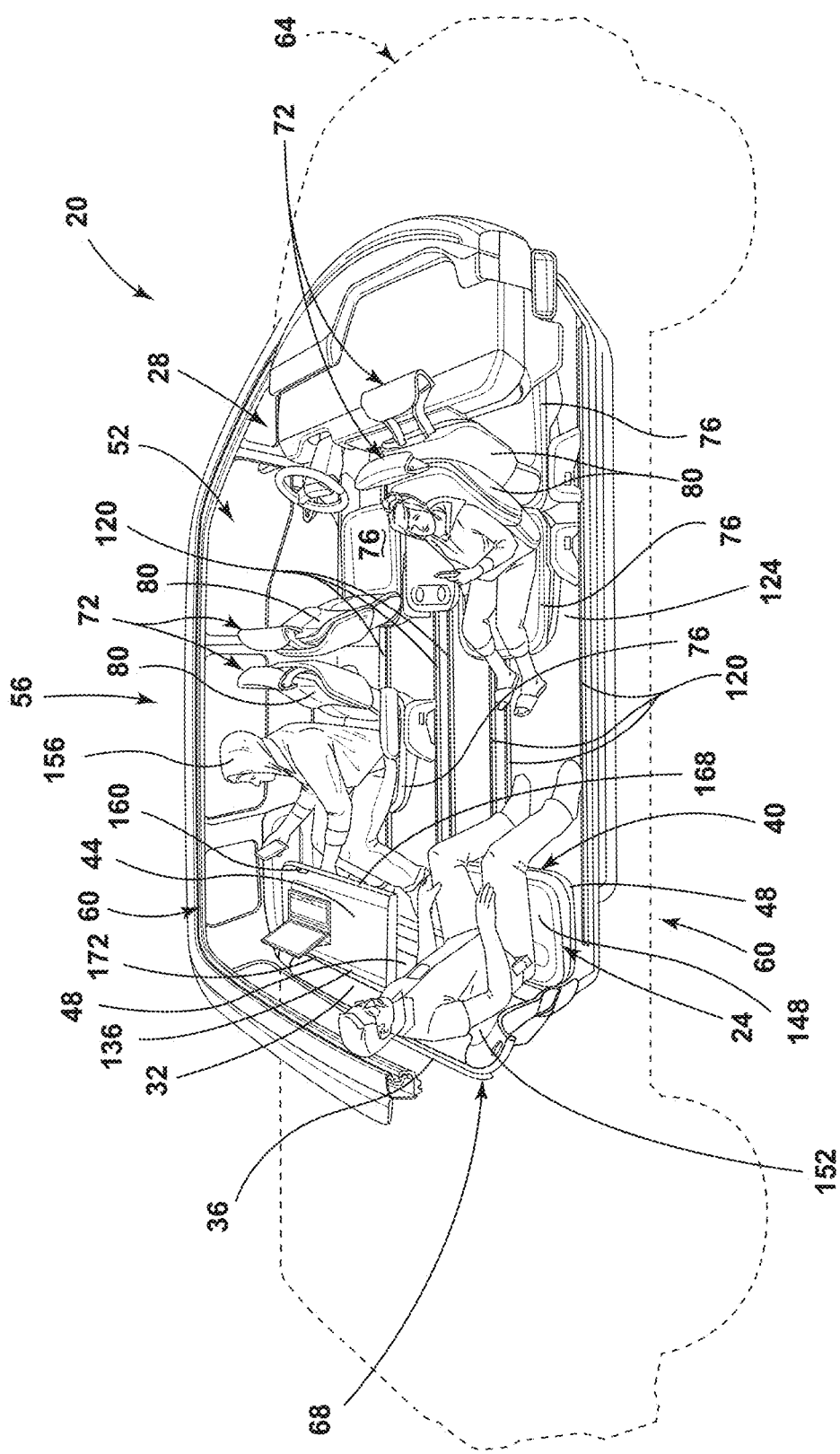
FIG. 2 is a side perspective view of the passenger compartment of the vehicle, illustrating a work surface in a deployed position, according to one arrangement when the vehicle is in a stationary non-moving state.
Figure 3:
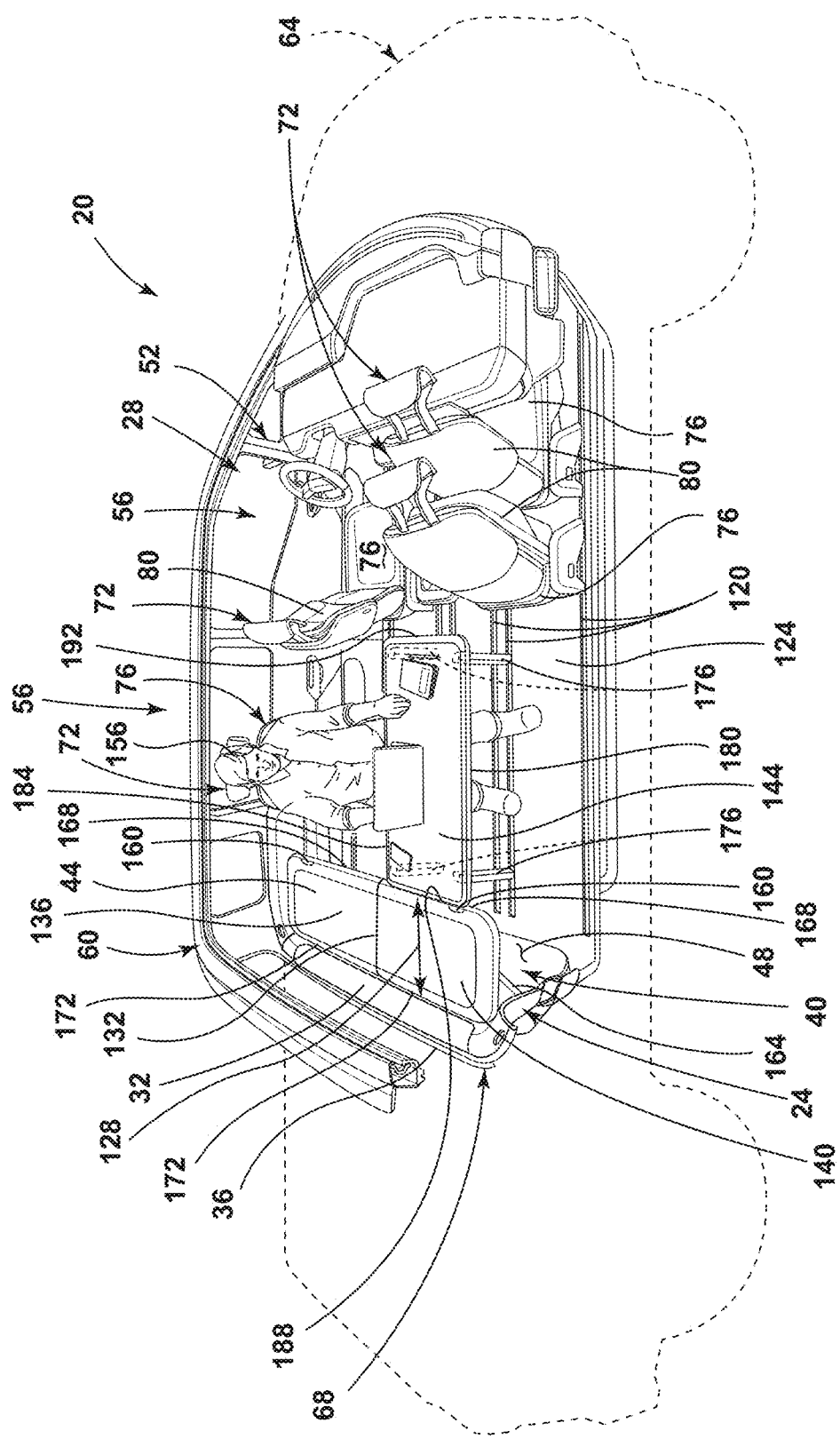
FIG. 3 is a side perspective view of the passenger compartment of the vehicle, illustrating a first work surface, a second work surface, and a third work surface in a deployed position, according to one example when the vehicle is in the stationary non-moving state.

Referring now to FIGS. 1-3, when the work surface 44 is in the stowed position, the work surface 44 can provide an abrasion resistant surface to the underside 48 of the seat 40. For example, the work surface 44 may be constructed from a polymeric material that can provide a degree of impact resistance and/or scratch resistance. The protection afforded to the underside 48 of the seat 40 by the work surface 44 being in the stowed position can be provided independent of the position of the seat 40. For example, when the seat 40 is in the deployed position and the work surface 44 is in the stowed position (FIG. 1), cargo items may be at least partially positioned below the seat 40 and the seat 40 may be protected from damage caused by such cargo items during maneuvering of the vehicle 20 (e.g., accelerating, decelerating, cornering, etc.). The coupling of the seat 40 to the support surface 36 of the vehicle 20 (e.g., a rear wall of the passenger compartment 28) may be accomplished in such a fashion that the seat 40 is suspended above a floor 124 of the passenger compartment 28 when the seat 40 is in the deployed position. Accordingly, the seating assembly 24 may be referred to as a stadium-style seating assembly or a theater-style seating assembly. The seating arrangements depicted in FIGS. 2 and 3 may be referred to as social arrangements, conferencing arrangements, and/or remote office arrangements. These social arrangements, conferencing arrangements, and/or remote office arrangements are intended for use when the vehicle 20 is in a stationary non-moving state (e.g., when the vehicle 20 is parked).

Referring again to FIGS. 1-3, one or more components of the vehicle 20 may prevent the work surface 44 from being transitioned to the deployed position when the seat 40 is in the deployed position. For example, a clearance between the underside 48 of the seat 40 and the floor 124 of the passenger compartment 28 may be less than a depth 128 of the work surface 44. Accordingly, intentional or unintentional deployment of the work surface 44 when the seat 40 is in the deployed position may be prevented by the work surface 44 contacting the floor 124 before the work surface 44 can reach the deployed position. In other words, the floor 124, or another component of the vehicle 20, can prevent the work surface 44 from reaching a fully-deployed position, but may permit the work surface 44 transitioning from the stowed position to a partially-deployed position. Therefore, in some examples, the work surface 44 may be movable to the deployed position only when the seat 40 is in the stowed position. However, the present disclosure is not so limited. Rather, it is contemplated that the work surface 44 may be movable to the deployed position (i.e., the fully-deployed position) when the seat 40 is in the deployed position such that the underside 48 of the seat 40, the work surface 44, the support surface 36, and/or the floor 124 of the passenger compartment 28 may at least partially define a cargo retention area that is positioned underneath the seat 40. Additionally, or alternatively, in examples where the work surface 44 is capable of deployment while the seat 40 is in the deployed position, the work surface 44 may provide a degree of support to the seat 40 by the work surface 44 engaging the floor 124. Said another way, the work surface 44 may act as legs for supporting the seat 40 when the seat 40 and the work surface 44 are each in the deployed position.

Referring further to FIGS. 1-3, the seating assembly 24 may be a bench-style seating assembly that is divided into a first section and a second section along a dividing line 132. In such an example, the dividing line 132 may be carried on to the work surface 44 such that the work surface 44 is separated into a first work surface 136 and a second work surface 140. Accordingly, a surface area of the work surface 44 may be adjusted based on a particular desired use. In various examples, a third work surface 144 may be coupled to the rail assemblies 120 in a removable fashion, as will be discussed in further detail herein. The work surface 44 can be pivotably coupled to the underside 48 of the seat 40. More specifically, the work surface 44 can be pivotably coupled to the underside 48 of the seat 40 proximate to a forward edge of the seat 40. A rotation axis of the work surface 44 may extend parallel to a lateral axis (e.g., a side-to-side axis) of the vehicle 20. The stowed position of the seat 40 may place the seat 40 in a generally vertical position (see FIG. 3). For example, the stowed position of the seat 40 may place a seating surface 148 of the seat 40 in an abutting relationship with a presented surface 152 of the seatback 32.

Referring again to FIGS. 1-3, the stowed position of the work surface 44 may place the work surface 44 in a generally parallel relationship with the seat 40. The generally parallel relationship between the seat 40 and the stored work surface 44 may be maintained independent of whether the seat 40 is in the stowed position or the deployed position. When the work surface 44 is transitioned to the deployed position, the work surface 44 may be placed in a non-parallel relationship with the seat 40. For example, the non-parallel relationship between the work surface 44 and the seat 40 may be a perpendicular relationship. More specifically, the seat 40 may assume a generally vertical position when the seat 40 is in the stowed position. Therefore, with the work surface 44 being arranged in a generally parallel relationship with the seat 40 when the work surface 44 is in the stowed position, the work surface 44 may assume a similar generally vertical position in the stowed position. However, when the seat 40 is in the stowed position and the work surface 44 is moved to the deployed position, the work surface 44 may assume a generally horizontal position for a user 156 to access.

Referring further to FIGS. 1-3, in various examples, the work surface 44 may be retained in the stowed position by one or more latch assemblies 160. When the user 156 desires to access the work surface 44, the latch assembly 160 may be disengaged, thereby permitting the user 156 to rotate the work surface 44 to the deployed position. Once in the deployed position, one or more support arms 164 may engage to provide a retention force for the work surface 44 to remain in the deployed position until such time as the user 156 elects to place the work surface 44 in the stowed position. In examples where the work surface 44 includes the first work surface 136 and the second work surface 140, one or more of the support arms 164 may be provided for each of the first work surface 136 and the second work surface 140. The support arms 164 may brace an underside of the work surface 44 at a location along the depth 128 of the work surface that is positioned between a free end 168 of the work surface 44 and a coupled end 172 of the work surface 44.

Referring still further to FIGS. 1-3, in various examples, the one or more latch assemblies 160 may be push-button assemblies that are biased to a locked position. Transitioning the latch assembly 160 to an unlocked position may be accomplished by applying a compressive force to the latch assembly 160 (e.g., applying a compressive force toward the coupled end 172). It is contemplated that the latch assemblies 160 may additionally, or alternatively, be provided with functionality that enables disengagement of the one or more support arms 164 that results in permitting transition of the work surface 44 from the deployed position to the stowed position. For example, pulling on the latch assembly 160 in a direction that is away from the coupled end 172 may aid in releasing the one or more support arms 164 from the position associated with the deployed position of the work surface 44.

With specific reference to FIG. 3, the third work surface 144 may be an accessory that is capable of removable coupling with the vehicle 20. For example, the third work surface 144 may be a manufacturer-offered add-on or an aftermarket accessory. In various examples, the third work surface 144 may be stowable in a cargo area of the vehicle 20. In some examples, the third work surface 144 may be configured for coupling to an underside of the work surface 44. For example, the third work surface 144 may be configured with the same, or similar, dimensions as the first work surface 136. In such an example, the underside 48 of the seat 40 and/or an underside of the first work surface 136 may be configured to receive the third work surface 144 for stowage purposes. Accordingly, when the first work surface 136 is in the deployed position, the third work surface 144 may be removed from the underside 48 of the seat 40 and/or the underside of the first work surface 136 to ultimately place the third work surface 144 in a deployed position. The deployed positions of the first work surface 136, the second work surface 140, and the third work surface 144 are depicted in FIG. 3.

Referring again to FIG. 3, the third work surface 144 may be provided with one or more legs 176. In various examples, the legs 176 of the third work surface 144 may be deployably coupled to an underside of the third work surface 144. For example, the legs 176 of the third work surface 144 may be rotatably coupled and/or removably coupled to the underside of the third work surface 144 to facilitate a more compact stowing of the third work surface 144. The one or more legs 176 may be configured for engagement with one or more of the rail assemblies 120. In some examples, the third work surface 144 may be provided with two of the legs 176 positioned along a first side 180 of the third work surface 144. In various examples, the third work surface 144 may be provided with four of the legs 176, with two of the legs 176 being positioned along the first side 180 of the third work surface 144 and two of the legs 176 being positioned along a second side 184 of the third work surface 144. In some examples, the third work surface 144 may engage with the free end 168 of the work surface 44 (e.g., the first work surface 136 or the second work surface 140) in a manner that provides a degree of support to a proximate end 188 of the third work surface 144. For example, the underside of the work surface 44 and/or the underside of the third work surface 144 may be provided with one or more fastener assemblies capable of extending therebetween such that the free end 168 and the proximate end 188 may be held in a generally abutting relationship by engagement of the one or more fastener assemblies.

Referring further to FIG. 3, in examples where the free end 168 and the proximate end 188 are capable of direct coupling with one another, the legs 176 may be provided at a distal end 192 of the third work surface 144. In such an example, the one or more support arms 164 of the work surface 44 can provide support to the proximate end 188 of the third work surface 144 such that the proximate end 188 and the free end 168 are both suspended above the floor 124 of the passenger compartment 28, thereby providing more continuous leg room for the user 156 than if one or more of the legs 176 were used in place of the one or more fastener assemblies. As used herein, the proximate end 188 and the distal end 192 may be in reference to relative positioning with regard to the work surface 44. Said another way, the proximate end 188 of the third work surface 144 may be the end of the third work surface 144 that is nearest to the work surface 44 and the distal end 192 may be the end of the third work surface 144 that is furthest from the work surface 44.

Referring now to FIGS. 4-9, the passenger compartment 28 of the vehicle 20 includes an upper region 196 and a lower region 200. The plurality of rail assemblies 120 are positioned on the floor 124 and extend along a longitudinal axis 204 of the vehicle 20. Each of a plurality of track assemblies 208 includes a first rail assembly 120A and a second rail assembly 120B. Ductwork 212 is positioned between adjacent track assemblies 208 of the plurality of track assemblies 208. The plurality of track assemblies 208 and the ductwork 212 are coupled together as a floor panel 216 such that installation of the floor panel 216 within the passenger compartment 28 results in a simultaneous installation of the plurality of track assemblies 208 and the ductwork 212.

Referring again to FIGS. 4-9, the first and second rail assemblies 120A, 120B of each of the plurality of track assemblies 208 can include a slot 220 that is defined by the given rail assembly 120 (e.g., the first rail assembly 120A or the second rail assembly 120B). The slot 220 permits access to a channel 224 that is defined by the given rail assembly 120 (e.g., the first rail assembly 120A or the second rail assembly 120B). The floor panel 216 can include a floor covering 228 that is positioned over top of the ductwork 212 and/or the plurality of track assemblies 208. In examples where the floor covering 228 is positioned over top of at least a portion of the plurality of track assemblies 208, the floor covering 228 is configured to maintain access to the slots 220 of the first and second rail assemblies 120A, 120B of each of the plurality of track assemblies 208. Alternatively, the floor covering 228 may not extend over a top surface of the rail assemblies 120. In such an example, a closeout member 232 may extend between each of the rail assemblies 120 and an immediately adjacent section of the floor covering 228. The closeout member 232, when employed, can provide a smoother transition between the floor covering 228 and the track assemblies 208 as compared to the same transition in the absence of the closeout member 232.

Referring further to FIGS. 4-9, a carriage assembly 236 is configured to be received within the channel 224. The carriage assembly 236 extends upwardly into the slot 220 and may be configured to couple, or engage, with one or more accessories or components of the vehicle 20. In various examples, the carriage assembly 236 can include an anchor 240. The anchor 240 can be configured to engage with, and retain, a seat leg 244 of the seating assembly 72. The anchor 240 of the carriage assembly 236 may protrude above the top surface of the associated rail assembly 120. The seat leg 244 of the seating assembly 72 may define a leg aperture 248. The anchor 240 can define an anchor aperture 252. The anchor aperture 252 can provide a cargo tie-down within the passenger compartment 28. For example, an accessory 256 may be configured for engagement with two of the anchor apertures 252. In such an example, the accessory 256 can extend between the anchors 240 that are associated with the given anchor apertures 252 such that the accessory 256 may provide a degree of horizontal retention and/or vertical retention for a cargo item 260 engaged therewith. While in current designs for the vehicle 20 there may be safety concerns associated with the stowage of the cargo item 260 within the passenger compartment 28, it is anticipated that technology and the regulatory framework may evolve in the future to where such an activity is safe and permissible.

Referring further to FIGS. 4-9, in various examples, the accessory 256 may be a rope, a strap, or any other suitable structure utilized for retaining the cargo item 260. The leg aperture 248 may be utilized as a region of the passenger compartment 28 through which the cargo item 260 may extend, thereby enabling the ability to store cargo items 260 that have a significant length associated there with (e.g., lumber, pipes, skis, and so on). The structure of the leg aperture 248 may provide a degree of horizontal retention and/or vertical retention to the cargo item 260. In various examples, the support surface 36 may be a rear wall of the passenger compartment 28. The support surface 36 may define a cargo aperture 264. The cargo aperture 264 may allow access between the passenger compartment 28 and a cargo area 268 of the vehicle 20. The cargo aperture 264 may be utilized to transfer items between the passenger compartment 28 and the cargo area 268. Additionally, or alternatively, the cargo aperture 264 may be utilized to extend a linear storage capacity of the cargo area 268, thereby enabling the vehicle 20 to transport items with a greater length (e.g., lumber, pipes, skis, and so on).

Figure 4:
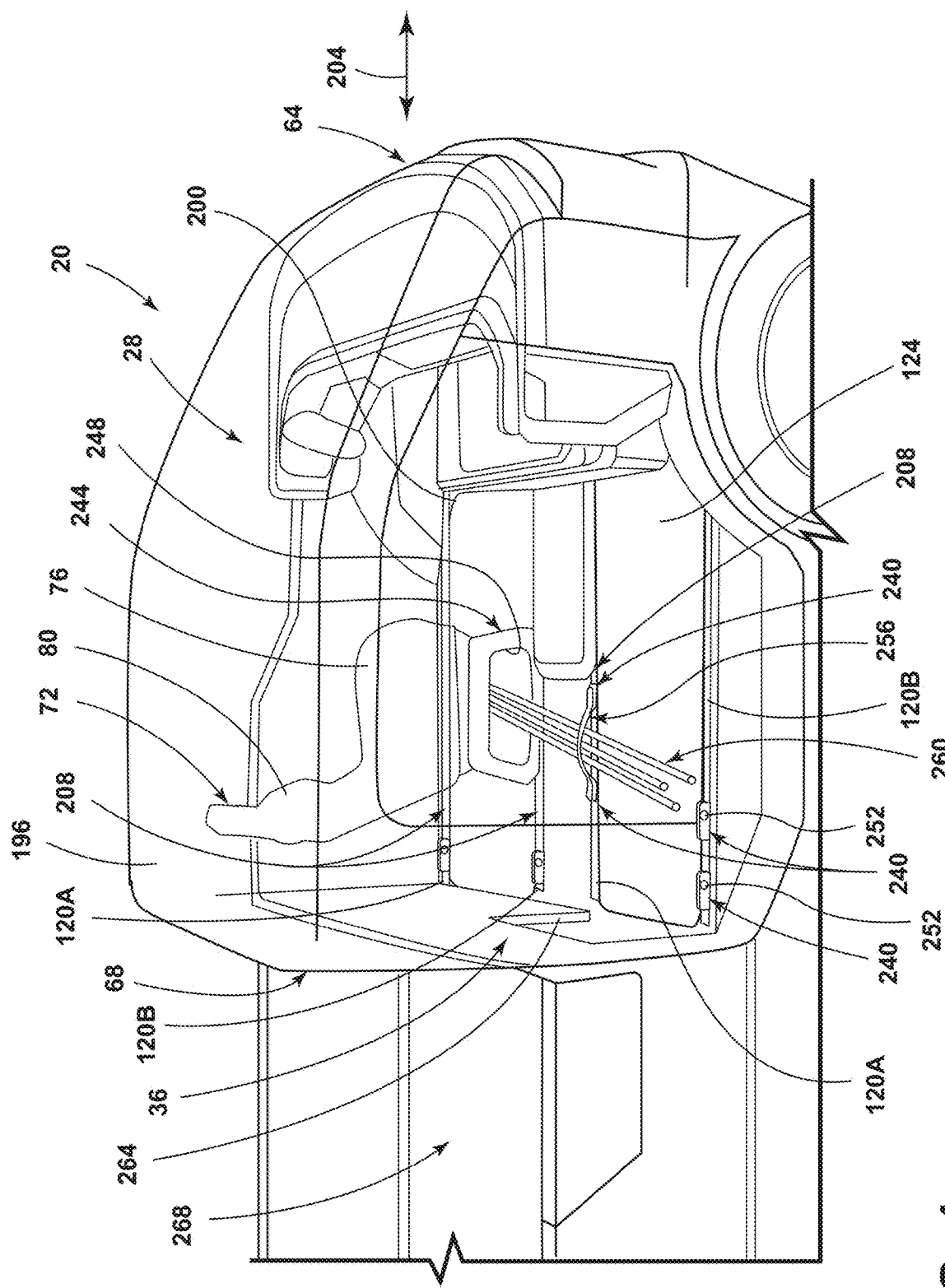
FIG. 4 is a side perspective view of the passenger compartment of the vehicle, illustrating various components thereof, according to one example.
Figure 5:
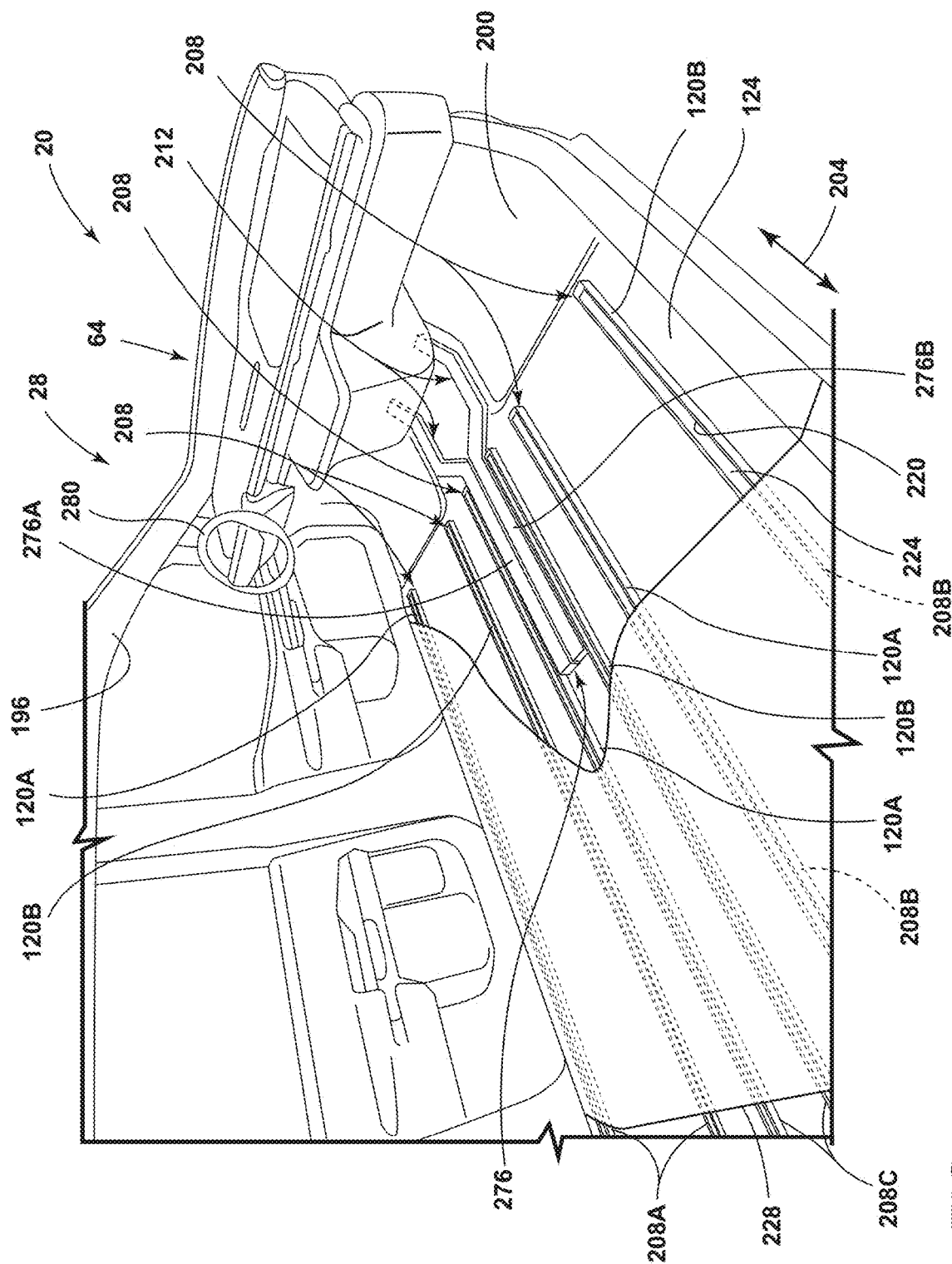
FIG. 5 is a rear perspective of the passenger compartment of the vehicle, illustrating ductwork and track assemblies, according to one arrangement.
Figure 6:
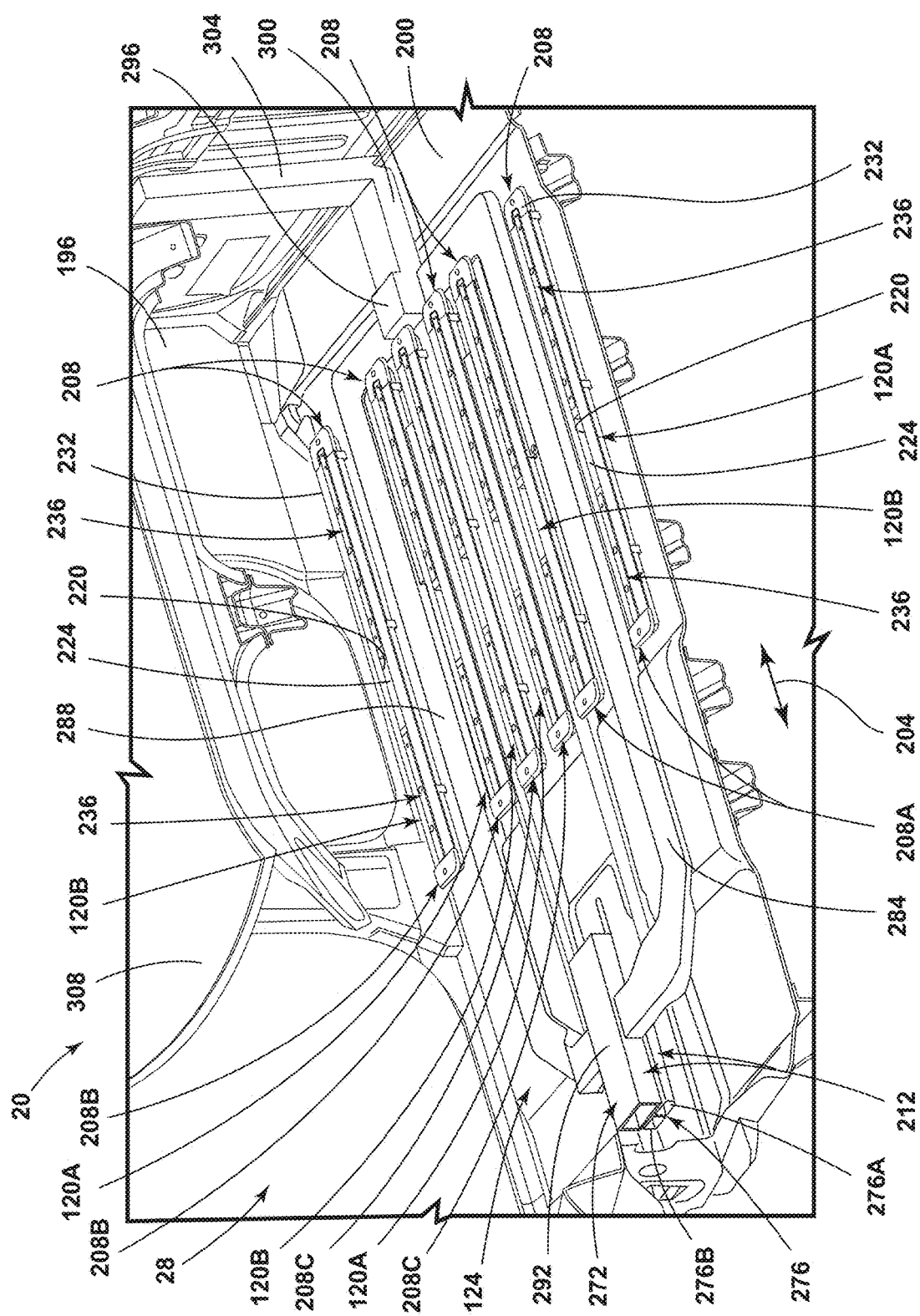
FIG. 6 is a front perspective view of the passenger compartment of the vehicle, illustrating the ductwork and the track assemblies, according to another arrangement.

With specific reference to FIGS. 4-6, the track assemblies 208 can have a length that is greater than 25% of a length of the passenger compartment 28. For example, the length of each of the rail assemblies 120 that make up the plurality of track assemblies 208 may be at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, and/or combinations or ranges thereof, of a longitudinal length of the passenger compartment 28.

Referring now to FIGS. 5 and 6, the ductwork 212 can include upper ductwork 272 and lower ductwork 276. The lower ductwork 276 can include a first lower ductwork 276A and a second lower ductwork 276B. The first and second lower ductwork 276A, 276B may be positioned in a side-by-side arrangement. A distance between the first lower ductwork 276A and the second lower ductwork 276B may be greater toward the front 64 of the vehicle 20 than the distance between the first lower ductwork 276A and the second lower ductwork 276B proximate to a front end of the plurality of track assemblies 208. Said another way, as the first and second lower ductwork 276A, 276B approach the front ends of the track assemblies 208 from the front 64 of the vehicle 20, the first lower ductwork 276A and the second lower ductwork 276B may converge to an abutting, or nearly abutting, relationship (see FIG. 5). In the depicted examples, the plurality of track assemblies 208 includes three track assemblies 208 positioned in a laterally spaced and parallel arrangement. The three track assemblies 208 may be referred to as a driver's side track assembly 208A, a passenger's side track assembly 208B, and a central track assembly 208C. The driver's side track assembly 208A may be nearest and/or in line with a traditional positioning of a driver of the vehicle 20, as indicated by a steering wheel 280. The passenger's side track assembly 208B is positioned furthest from the driver's side track assembly 208A and the steering wheel 280. The central track assembly 208C is positioned between the driver's side track assembly 208A and the passenger's side track assembly 208B.

Referring again to FIGS. 5 and 6, the first lower ductwork 276A and the second lower ductwork 276B may extend along, and between, the first and second rail assemblies 120A, 120B of the central track assembly 208C. While the first lower ductwork 276A and the second lower ductwork 276B are shown in a truncated manner for illustrative purposes, the present disclosure does not seek to limit the size, dimensions, or relative lengths of the first lower ductwork 276A and the second lower ductwork 276B. Rather, it is contemplated that the first lower ductwork 276A and the second lower ductwork 276B may be provided with different lengths to enable supplying conditioned air (e.g., heated air and/or cooled air) to locations throughout the passenger compartment 28. In alternative arrangements, the first lower ductwork 276A and the second lower ductwork 276B may be positioned on either side of the central track assembly 208C such that the first and second lower ductworks 276A, 276B are not positioned between the first rail assembly 120A and the second rail assembly 120B of the central track assembly 208C (see FIG. 6). As depicted in FIG. 6, the lower ductwork 276 may be positioned between adjacent ones of the plurality of track assemblies 208. Said another way, the first lower ductwork 276A may be positioned between the driver's side track assembly 208A and the central track assembly 208C. Similarly, the second lower ductwork 276B may be positioned between the passenger's side track assembly 208B and the central track assembly 208C.

Referring further to FIGS. 5 and 6, the upper ductwork 272 can be positioned between the first and second rail assemblies 120A, 120B of at least two of the plurality of track assemblies 208. For example, as depicted in FIG. 6, a first arm 284 of the upper ductwork 272 may extend between the first rail assembly 120A and the second rail assembly 120B of the driver's side track assembly 208A. In such an example, a second arm 288 of the upper ductwork 272 may extend between the first rail assembly 120A and the second rail assembly 120B of the passenger's side track assembly 208B. Accordingly, in various examples, a majority of the adjacent rail assemblies 120, either within a given one of the plurality of track assemblies 208 or between adjacent ones of the plurality of track assemblies 208, may be provided with at least a portion of the ductwork 212 extending therebetween. For example, when three of the track assemblies 208 are employed within the passenger compartment 28, five pathways may exist between adjacent rail assemblies 120. In such an example, three or more of the pathways between adjacent rail assemblies 120 may contain at least a portion of the ductwork 212 extending therethrough. For example, three of the five available pathways between adjacent rail assemblies 120 may contain at least a portion of the ductwork 212, four of the five available pathways between adjacent rail assemblies 120 may contain at least a portion of the ductwork 212, or five of the five available pathways between adjacent rail assemblies 120 may contain at least a portion of the ductwork 212. The upper ductwork 272 can be configured to deliver air to the upper region 196 of the passenger compartment 28. The lower ductwork 276 can be configured to deliver air to the lower region 200 of the passenger compartment 28.

With specific reference to FIG. 6, the upper ductwork 272 can include a forward bulkhead 292 and a rearward bulkhead 296. The forward bulkhead 292 may be a point of divergence for air delivery that is received from climate control components that are positioned upstream of the forward bulkhead 292 (e.g., a blower or a fan). Air received at the forward bulkhead 292 can be directed into the first arm 284 and the second arm 288, thereby representing the point of divergence for airflow. The rearward bulkhead 296 may represent a point of convergence for the airflow that was directed along the first arm 284 and the second arm 288. At the rearward bulkhead 296, upstream air pressure provided by at least one component of the climate control system (e.g., the blower or the fan) may force the air received at the rearward bulkhead 296 along a rearward conduit 300 of the upper ductwork 272. From the rearward conduit 300, the air may be directed along a vertical conduit 304 toward a ceiling 308 of the passenger compartment 28. In various examples, the air delivered through the upper ductwork 272 may not exit the upper ductwork 272 until the air has reached the ceiling 308 of the passenger compartment 28.

Figure 7:
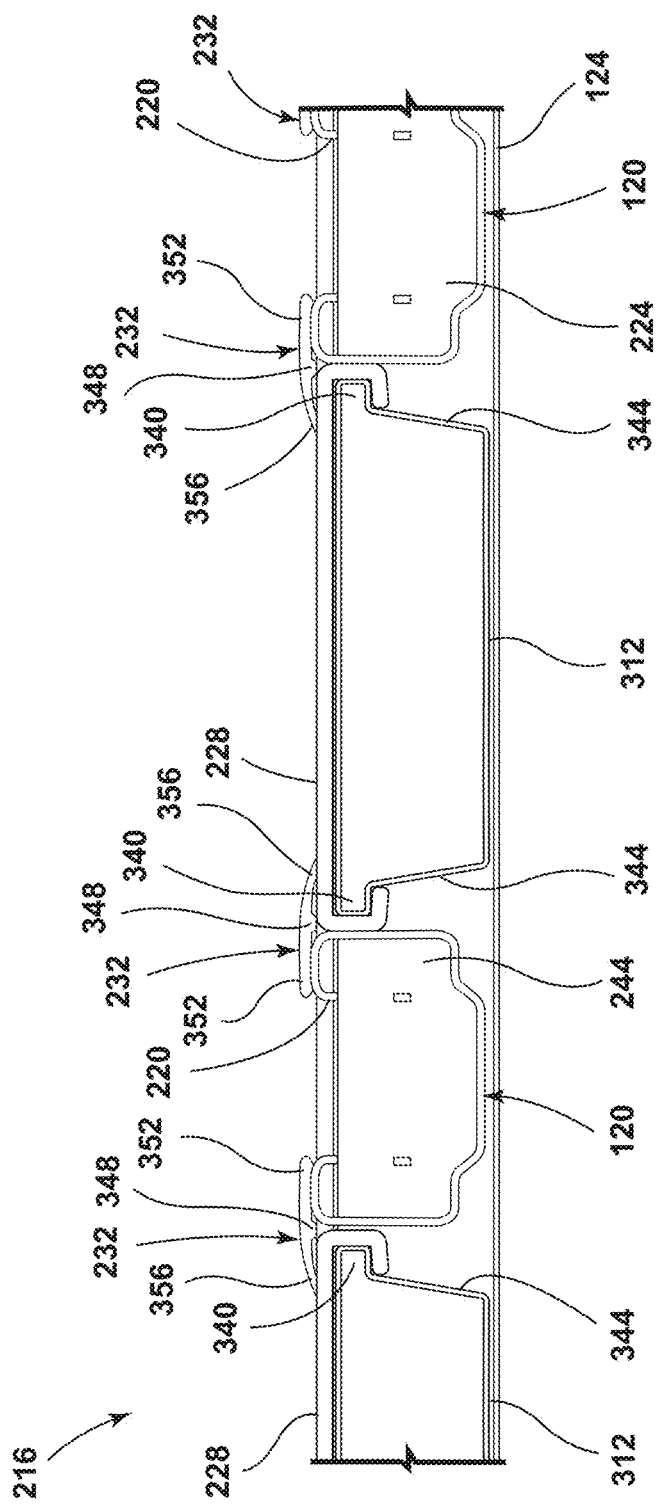
FIG. 7 is a schematic view of an end of a floor panel of the passenger compartment, according to one example.
Figure 8:
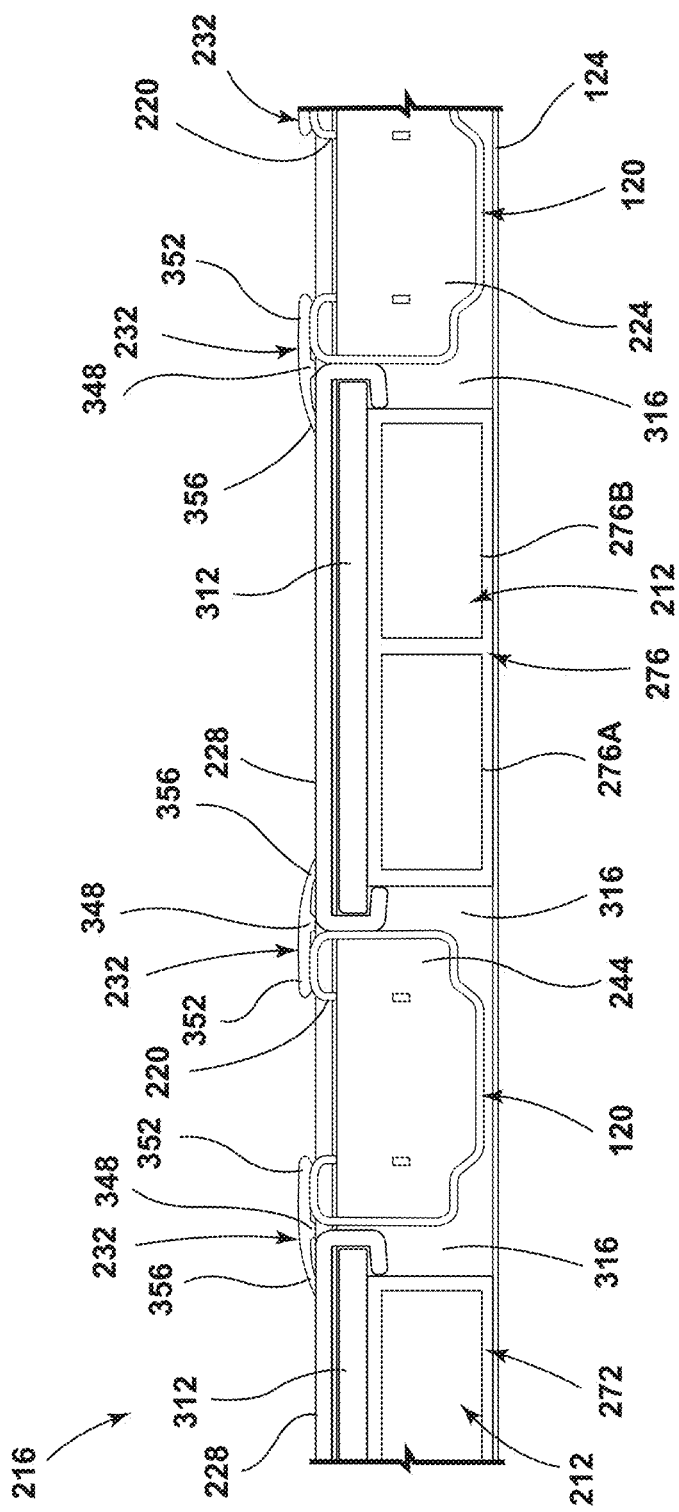
FIG. 8 is a schematic view of the end of the floor panel of the passenger compartment, according to another example.
Figure 9:
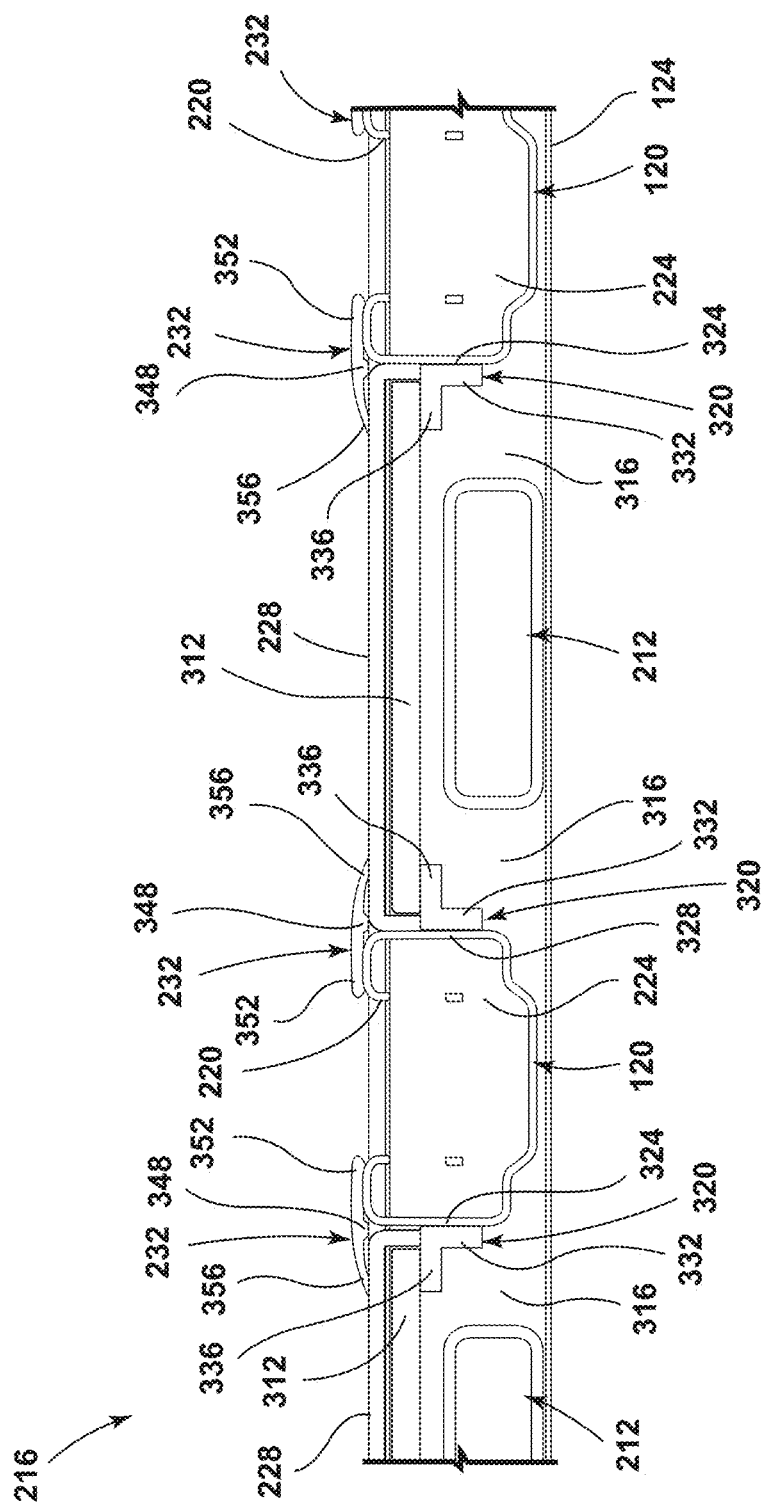
FIG. 9 is a schematic view of the end of the floor panel of the passenger compartment, according to a further example.

Referring now to FIGS. 7-9, a support member 312 may be positioned in at least one location chosen from between adjacent rail assemblies 120 and between adjacent track assemblies 208. In other words, the support member 312 may be positioned between adjacent rail assemblies 120 and/or between adjacent track assemblies 208. The support member 312 may at least partially define a chamber 316. In various examples, the floor 124 of the passenger compartment 28 may provide a lower wall of the chamber 316. In some examples, the ductwork 212 may be received within the chamber 316. The support member 312 may be a solid material or the support member 312 may be hollow. In some examples, the support member 312 may rest on an upper surface of the ductwork 212 (e.g., the upper ductwork 272 and/or the lower ductwork 276). In various examples, a support bracket 320 may be coupled to each of a first side 324 and a second side 328 of each of the rail assemblies 120 (e.g., each of the first rail assemblies 120A and each of the second rail assemblies 120B).

Referring again to FIGS. 7-9, the support bracket 320 can provide support to an underside of the support member 312. In such an example, the support brackets 320 can suspend the support members 312 above the floor 124 of the passenger compartment 28. In various examples, the support bracket 320 can include a first projecting arm 332 and a second projecting arm 336. The first projecting arm 332 may be directly coupled to the rail assembly 120. The second projecting arm 336 may be indirectly coupled to the rail assembly 120 by the first projecting arm 332. The second projecting arm 336 extends away from the first projecting arm 332 to provide a support surface for engaging the underside of the support member 312.

Referring further to FIGS. 7-9, in various examples, the floor covering 228 may wrap, or extend, around at least a portion of the support member 312. For example, as depicted in FIG. 7, the support member 312 may define a ledge 340 on lateral sides of the support member 312. In such an example, the floor covering 228 may wrap, or extend, around the ledges 340 and engage with a side surface 344 of the support member 312 at a location that is below the ledge 340. In alternate examples, such as that depicted in FIG. 8, the support member 312 may be a planar structure such that the floor covering 228 extends around lateral edges of the support member 312 and engages with an underside of the support member 312. In such an example, the floor covering 228 may contact side surfaces of the ductwork 212. In other alternate examples, such as that depicted in FIG. 9, the floor covering 228 may not engage in an underside of the support member 312. In such an example, the floor covering 228 may extend along the lateral sides of the support member 312 and engage with the upper surface of the second projecting arm 336.

Referring still further to FIGS. 7-9, the closeout member 232 may be provided with a tab 348 that extends downwardly therefrom. In various examples, the tab 348 may extend between adjacent surfaces of the rail assembly 120 and the floor covering 228. The closeout member 232 may include a first portion 352 that is configured to engage with, and/or extend over, a top surface of the rail assembly 120. The first portion 352 of the closeout member 232 extends toward the slot 220 from the tab 348. The first portion 352 of the closeout member 232 may be generally planar. A second portion 356 of the closeout member 232 extends away from the slot 220 from the tab 348. The second portion 356 is configured to engage with an upper surface of the floor covering 228. In various examples, the second portion 356 of the closeout member 232 may have an arcuate shape. In such an example, the arcuate shape of the second portion 356 may aid in moving cargo items about the passenger compartment 28 and/or provide a smoother transition between the floor covering 228 and the rail assemblies 120.

The floor panel 216 described herein can represent an increase in manufacturing efficiency by providing a multi-component assembly that is capable of installation as a single unit within the passenger compartment 28. For example, the floor panel 216 may be inserted into the passenger compartment 28 during manufacture by passing the floor panel 216 through a windshield aperture that is defined by a body of the vehicle 20 or by passing the floor panel 216 through a rear window aperture that is defined by the body. Additionally, the substantially alternating arrangement of the rail assemblies 120, the track assemblies 208, and/or the ductwork 212 (e.g., the upper ductwork 272 and/or the lower ductwork 276) can provide an even distribution of treated air (e.g., heated, cooled, and/or dehumidified) to the passenger compartment 28. For example, occupants seated in the first row 52, the second row 56, the third row 60, on the driver's side, and/or on the passenger's side may each be provided with a thermally-controlled environment in an efficient manner.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a passenger compartment comprising an upper region and a lower region;
   a floor of the passenger compartment;
   a plurality of track assemblies positioned on the floor and extending along a longitudinal direction of the vehicle, wherein each of the plurality of track assemblies comprises a first rail assembly and a second rail assembly;
   a support member positioned in at least one location chosen from between adjacent rail assemblies and between adjacent track assemblies, the support member at least partially circumscribed with a floor covering; and
   ductwork positioned between adjacent track assemblies of the plurality of track assemblies, wherein the plurality of track assemblies and the ductwork are coupled together as a floor panel such that installation of the floor panel within the passenger compartment results in a simultaneous installation of the plurality of track assemblies and the ductwork.

2. The vehicle of claim 1, wherein the first and second rail assemblies of each of the plurality of track assemblies comprises a slot defined by the given rail assembly, and wherein the slot permits access to a channel defined by the given rail assembly.

3. The vehicle of claim 2, wherein the floor covering is positioned over top of the ductwork and the plurality of track assemblies, wherein the floor covering is configured to maintain access to the slots of the first and second rail assemblies of each of the plurality of track assemblies.

4. The vehicle of claim 2, further comprising:
a carriage assembly that is configured to be received within the channel, and wherein the carriage assembly extends upwardly into the slot.

5. The vehicle of claim 4, wherein the carriage assembly comprises an anchor.

6. The vehicle of claim 5, wherein the anchor is configured to engage with, and retain, a leg of a seating assembly.

7. The vehicle of claim 5, wherein the anchor defines an anchor aperture, and wherein the anchor aperture provides a cargo tie-down within the passenger compartment.

8. The vehicle of claim 1, wherein each of the plurality of track assemblies has a length that is greater than twenty-five percent of a length of the passenger compartment.

9. The vehicle of claim 1, wherein the ductwork comprises:
upper ductwork; and
lower ductwork.

10. The vehicle of claim 9, wherein the upper ductwork is positioned between the first and second rail assemblies of at least two of the plurality of track assemblies, wherein the upper ductwork is configured to deliver air to the upper region of the passenger compartment, and wherein the lower ductwork is configured to deliver air to the lower region of the passenger compartment.

11. The vehicle of claim 1, wherein the support member at least partially defines a chamber, and wherein a lower wall of the chamber is the floor of the passenger compartment.

12. The vehicle of claim 11, wherein the ductwork is received in the chamber.

13. The vehicle claim 1, further comprising:
a support bracket coupled to each of a first side and a second side of each of the first and second rail assemblies.

14. The vehicle of claim 13, wherein the support bracket supports an underside of the support member.

15. The vehicle of claim 14, wherein the support brackets suspend the support member above the floor of the passenger compartment.

16. A vehicle, comprising:
a passenger compartment comprising an upper region and a lower region;
a floor of the passenger compartment;
a plurality of track assemblies positioned on the floor and extending along a longitudinal direction of the vehicle, wherein each of the plurality of track assemblies has a length that is greater than twenty-five percent of a length of the passenger compartment, wherein each of the plurality of track assemblies comprises a first rail assembly and a second rail assembly, and wherein the first and second rail assemblies of each of the plurality of track assemblies comprises a slot defined by the given rail assembly, and wherein the slot permits access to a channel defined by the given rail assembly;
a support member positioned in at least one location chosen from between adjacent rail assemblies and between adjacent track assemblies;
lower ductwork positioned between adjacent track assemblies of the plurality of track assemblies, wherein the lower ductwork is configured to deliver air to the lower region of the passenger compartment;
upper ductwork positioned between the first and second rail assemblies of at least two of the plurality of track assemblies, wherein the upper ductwork is configured to deliver air to the upper region of the passenger compartment; and
a floor covering positioned over top of the upper ductwork, the lower ductwork, and the plurality of track assemblies, wherein the floor covering is configured to maintain access to the slots of the first and second rail assemblies of each of the plurality of track assemblies, wherein the plurality of track assemblies, the support member, the lower ductwork, the upper ductwork, and the floor covering are coupled together as a floor panel such that installation of the floor panel within the passenger compartment results in a simultaneous installation of the plurality of track assemblies, the support member, the lower ductwork, the upper ductwork, and the floor covering.

17. The vehicle of claim 16, further comprising:
a carriage assembly that is configured to be received within the channel, wherein the carriage assembly extends upwardly into the slot, and wherein the carriage assembly comprises an anchor.

18. The vehicle of claim 17, wherein the anchor is configured to engage with, and retain, a leg of a seating assembly.

19. The vehicle of claim 17, wherein the anchor defines an aperture, and wherein the aperture provides a cargo tie-down within the passenger compartment.

20. The vehicle of claim 9, wherein the lower ductwork includes a first lower ductworks and a second lower ductwork side-by-side with the first lower duct work, and wherein the first lower ductwork and the second lower ductwork abut the upper ductwork.

* * * * *